US007282117B2

(12) United States Patent
Vijayendran et al.

(10) Patent No.: US 7,282,117 B2
(45) Date of Patent: *Oct. 16, 2007

(54) CELLULOSIC FIBER COMPOSITES USING PROTEIN HYDROLYSATES AND METHODS OF MAKING SAME

(75) Inventors: Bhima Rao Vijayendran, Dublin, OH (US); Jan Moon, London, OH (US)

(73) Assignee: Battelle Memorial Institute, Columbus, OH (US)

( * ) Notice: Subject to any disclaimer, the term of this patent is extended or adjusted under 35 U.S.C. 154(b) by 205 days.

This patent is subject to a terminal disclaimer.

(21) Appl. No.: 10/698,217

(22) Filed: Oct. 31, 2003

(65) Prior Publication Data

US 2004/0132870 A1    Jul. 8, 2004

Related U.S. Application Data

(63) Continuation of application No. 09/779,273, filed on Feb. 8, 2001, now Pat. No. 6,719,882.

(51) Int. Cl.
*D21H 17/22* (2006.01)
*D21H 17/48* (2006.01)

(52) U.S. Cl. ............... 162/164.6; 162/165; 162/174

(58) Field of Classification Search ............. 162/164.6, 162/165, 174
See application file for complete search history.

(56) References Cited

U.S. PATENT DOCUMENTS

| 2,315,400 | A | * | 3/1943 | D Alelio .................. 526/71 |
| 2,368,466 | A | | 1/1945 | Golick et al. |
| 2,400,541 | A | | 5/1946 | Cone |
| 2,817,639 | A | | 12/1957 | Ash et al. |
| 2,899,352 | A | | 8/1959 | Young et al. |
| 3,095,313 | A | | 6/1963 | Cone |
| 3,843,756 | A | * | 10/1974 | Talbott et al. ............. 264/441 |
| 4,130,515 | A | * | 12/1978 | Bornstein ................. 527/400 |
| 4,158,713 | A | * | 6/1979 | Degens ..................... 428/212 |
| 4,182,696 | A | * | 1/1980 | Wynstra et al. ............ 524/14 |
| 4,357,454 | A | * | 11/1982 | Holmberg et al. ......... 527/403 |
| 4,376,745 | A | * | 3/1983 | Johns ....................... 264/109 |
| 4,423,095 | A | * | 12/1983 | Blizzard ................... 427/387 |
| 4,944,823 | A | | 7/1990 | Stofko |
| 5,582,682 | A | | 12/1996 | Ferretti |
| 5,593,625 | A | | 1/1997 | Riebel et al. |
| 5,611,882 | A | | 3/1997 | Riebel et al. |
| 5,635,123 | A | | 6/1997 | Riebel et al. |
| 5,674,338 | A | | 10/1997 | Parker et al. |

FOREIGN PATENT DOCUMENTS

| JP | 04 219203 A | 12/1992 |
| WO | WO95 04779 A | 2/1995 |
| WO | WO96 18675 A | 6/1996 |

OTHER PUBLICATIONS

Clay et al., "Rheological Study of Soy Protein-Based PRF Wood Adhesives", Proceedings of the SPE ANTEC 99 Abstracts, May 2-6, 1999, pp. 1298-1301.
Hse, "Development of Phenolic Resins Co-Reacted with Soy Flour Hydrolyzate", Biographies & Abstracts, Forest Products Society 54th Annual Meerting, Jun. 18-21, 2000, p. 22.
Vijayendran et al., "Some recent Studies on Soy Protein-Based Wood Adhesives", Biographies & Abstracts, Forest Products Society 54th Annual Meeting, Jun. 18-21, 2000, p. 22.
Vijayendran et al., "Studies on the Alkaline Hydrolysis of Soy Protein and Characterization of Hydrolysate Products for Potential Application in Wood Adhesives", Abstracts, 89th AOCS Annual Meeting & Expo, Chicago, IL, May 10-13, 1998, p. 18.
Kreibich, "New Adhesives Based on Soybean Proteins", report to American Soybean Council, 1995, pp. 1-19.
Vijayendran et al., "Gelling Studies in Phenol Resorcinol Formaldehyde (PRF) Soy Protein Adhesive Systems", Abstracts, 90th AOCS Meeting & Expo, May 9-12, 1999, pp. S32-33.
Bian et al., "The Use of Soy Protein-Phenol Resorcinol Formaldehyde Adhesive in End-Jointed Lumber: An Update", Abstracts, 90th AOCS Meeting & Expo, May 9-12, p. S33, 1999.
Rials et al., "Performance Properties of Urea-Formaldehyde Resins Modified with Hydrolyzed Soy Protein", Abstracts, 90th AOCS Meeting & Expo, May 9-12, p. S33, 1999.
Sellers, "Growing markets for engineered products spurs research", Wood Technology, May/Jun. 2000, pp. 40-43.
"Feedstocks—News about industrial products made from Soy"
"Soy Glue: Less Expensive, Just as Effective", USB, vol. 3, Issue 4, Sep. 1998, pp. 1-4.

* cited by examiner

*Primary Examiner*—Steven P. Griffin
*Assistant Examiner*—Dennis R. Cordray
(74) *Attorney, Agent, or Firm*—Dinsmore & Shohl LLP

(57) ABSTRACT

Cellulosic fiber composites and finished cellulosic fiber composite articles are provided. The cellulosic fiber composites comprise cellulosic material and a resin binder. The resin binder comprises vegetable protein hydrolysates and a synthetic resin. The synthetic resin can be phenolic resin, isocyanate resin, or combinations thereof. The composite contains an effective amount of resin binder so as to bind together the cellulosic material. The amount of resin binder is less than 40% of the dry weight of the cellulosic material. The protein hydrolysates provide a composite with a reduced amount of petrochemicals. The composite can also contain a silicone, silane, or combination thereof.

36 Claims, 4 Drawing Sheets

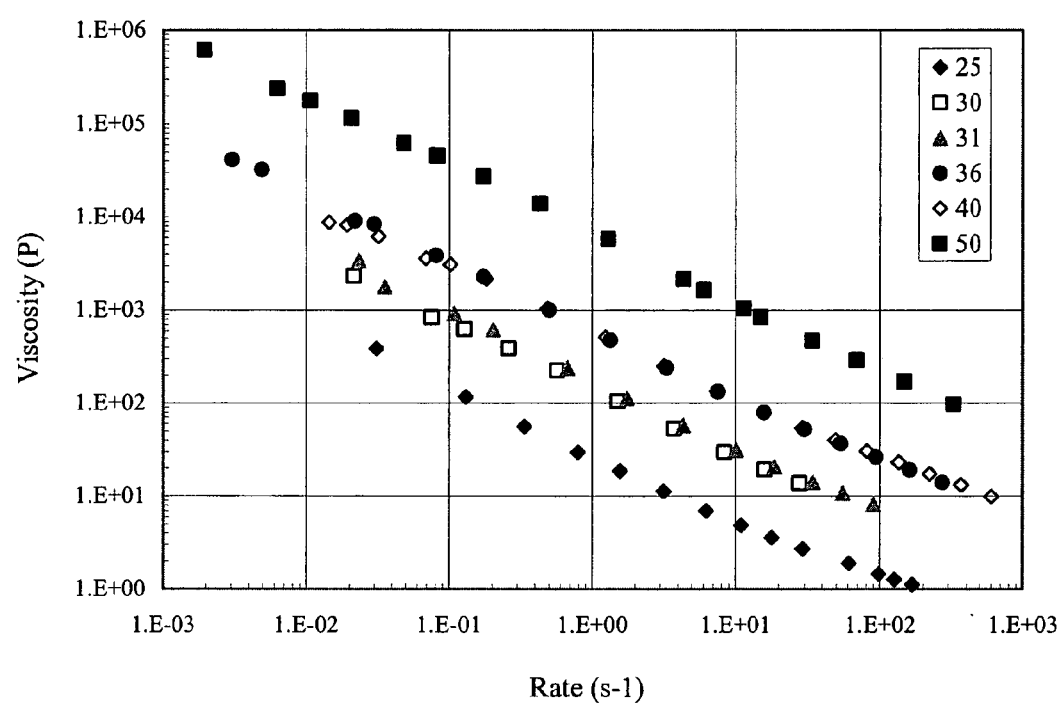
Figure 1. Soy Hydrolysate Viscosity vs. Shear Rate

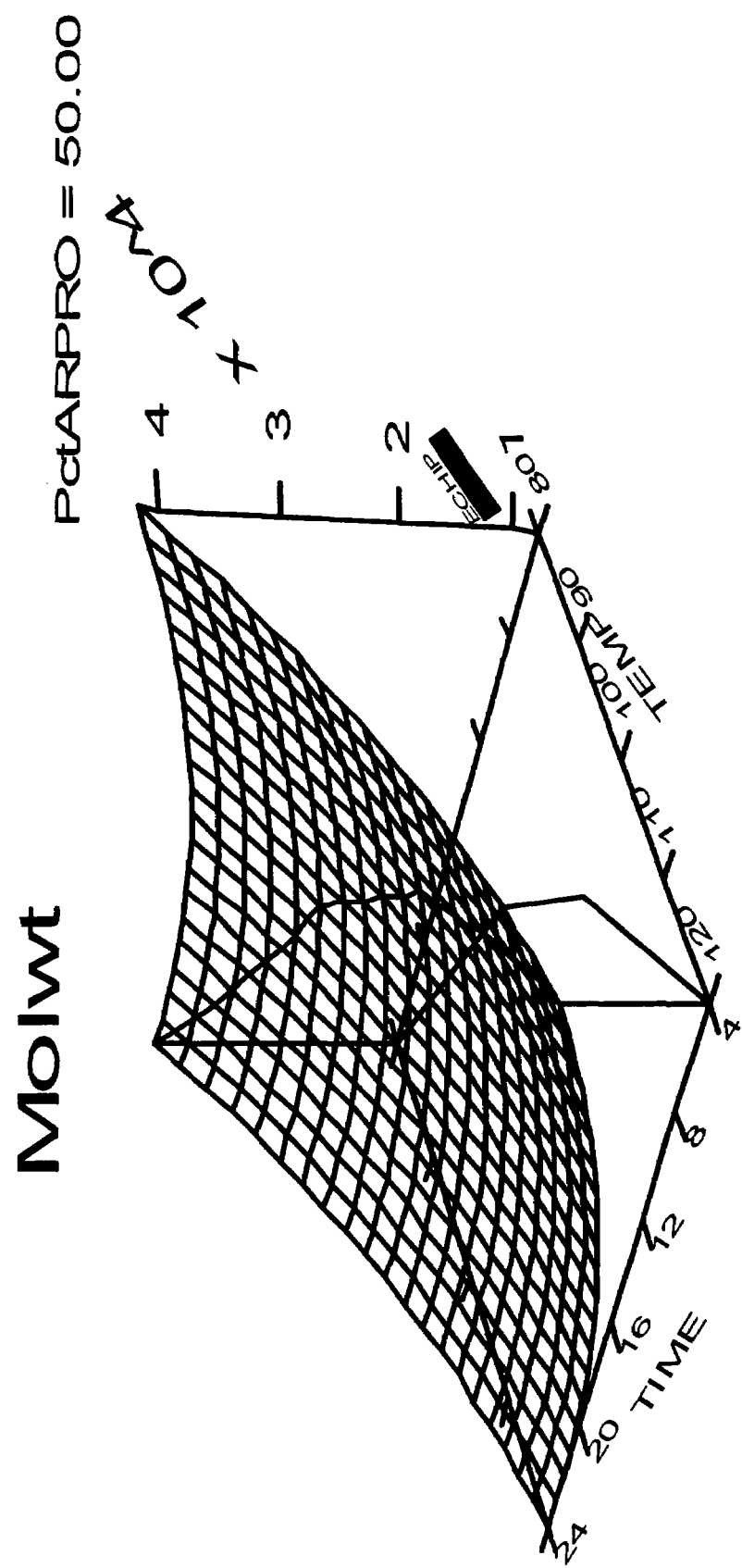
Figure 2. Peak Molecular Weight of Hydrolysate vs. Time and Temperature of Hydrolysis

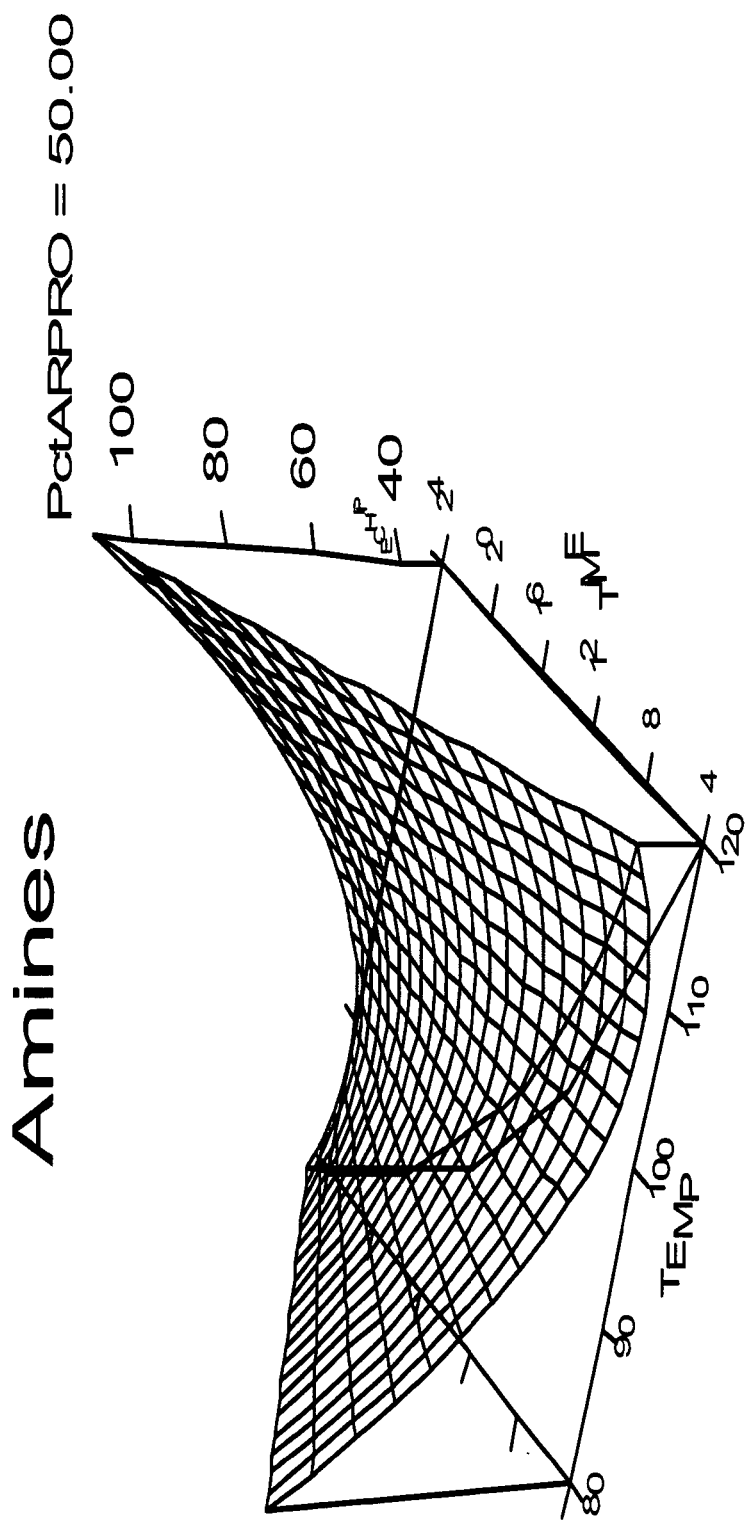
Figure 3. Total Amine Level of Hydrolysate vs. Time and Temperature of Hydrolysis

Figure 4. Process Variables vs. Board Properties
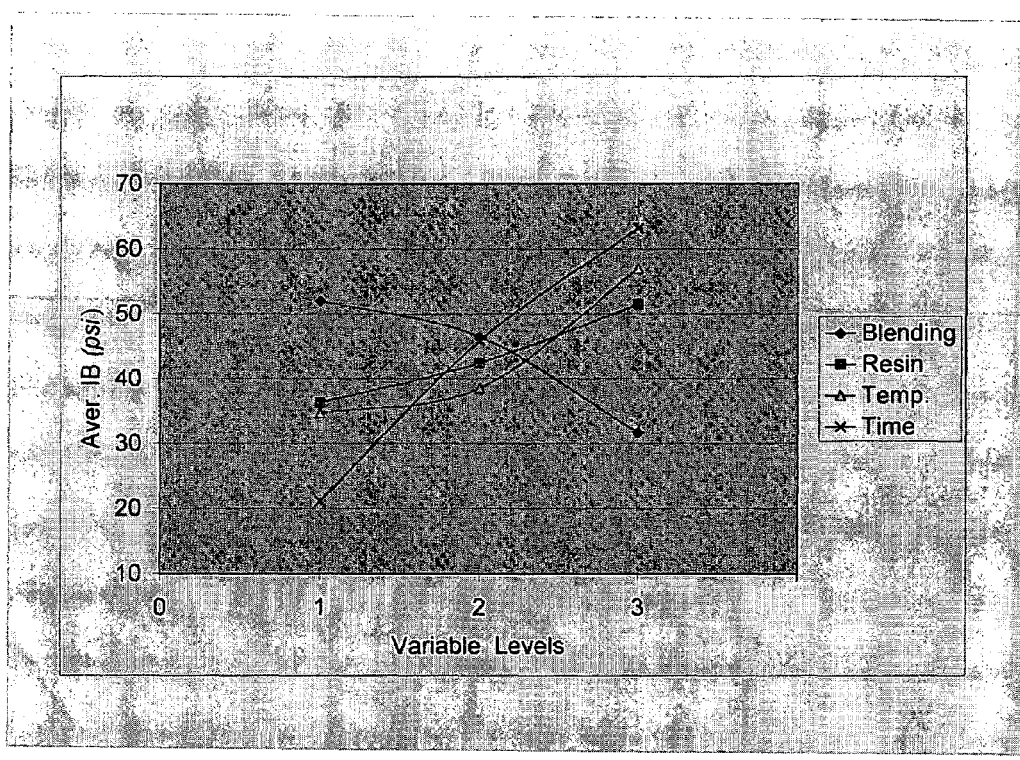

CELLULOSIC FIBER COMPOSITES USING PROTEIN HYDROLYSATES AND METHODS OF MAKING SAME

CROSS-REFERENCE TO RELATED APPLICATIONS

This application is a continuation of application Ser. No. 09/779,273, filed Feb. 8, 2001, issued as U.S. Pat. No. 6,719,882 and entitled "CELLULOSIC FIBER COMPOSITES USING PROTEIN HYDROLYSATES AND METHODS OF MAKING SAME".

BACKGROUND OF THE INVENTION

The present invention relates generally to cellulosic fiber composites using protein hydrolysates, and to the method of using protein hydrolysates in the manufacture of agricultural and other cellulosic fiber composites.

Currently, petroleum based binders such as polymeric isocyanates, phenolic and other formaldehyde-based resins, including phenol formaldehyde, phenol resorcinol formaldehyde, and urea formaldehyde, are employed in the manufacture of cellulosic fiber composites such as agfiber board and oriented strand board. However, these binders exhibit several disadvantages such as formaldehyde emissions, high temperature requirements to enable the binders to set, difficulty in handling of resins, and high materials and production costs. It would be desirable to reduce the amount of phenolic and isocyanate resin employed in the production of cellulosic fiber composites.

U.S. Pat. No. 4,944,823 ('823) describes a method for bonding wood surfaces together by heating and pressing using a dry binder formulation constituting a thorough mixture of an isocyanate and a carbohydrate such as a sugar or starch in the manufacture of composite wood products. The sugar or starch replaces a quantity of the isocyanate which would normally have been used, thereby reducing the total quantity of isocyanate. However, the binder described by the '823 patent does not include a source of protein nor protein hydrolysate.

Natural legume-based resins have been employed with cellulosic material in the preparation of rigid, pressure-formed biocomposites (U.S. Pat. Nos. 5,593,625 and 5,635,123). These embodiments employ close to equal amounts of legume-based resin and fiberous cellulosic solids (40-56% resin solids) in the production of fiber-reinforced, protein-based discrete high moisture-content particles having a moisture content of about 55-75% by weight. By assuring that the moisture content remains above 59% by weight, the relatively high amount of legume-based resin fully impregnates the particles such that a new composite material is prepared rather than a material that is produced by gluing fiberous cellulosic solids together by an adhesive. The particles can be combined with a secondary thermosetting binder to form the biocomposite materials. As a result, preparation of such biocomposites requires an additional drying step to reduce the moisture content to less than about 20% by weight prior to pressing.

It would be desirable to produce finished cellulosic fiber composites through a method which employs materials having a relatively low moisture content and which does not require an additional drying stage or step. Therefore, there remains a need for a new fiber-adhesive, resin binder system for use in the manufacture of agricultural and other cellulosic fiber composites, which reduces the amount of phenolic and/or isocyanate resin needed.

SUMMARY OF THE INVENTION

The present invention meets this need by providing cellulosic fiber composites, methods for preparing cellulosic fiber composites, and finished cellulosic fiber composite articles. The cellulosic fiber composites comprise a cellulosic material and a resin binder comprising protein hydrolysates and a synthetic resin, wherein the synthetic resin is phenolic resin, isocyanate resin, or combinations thereof. The composites contain an effective amount of resin binder so as to bind together the cellulosic material.

In accordance with the present invention, a resin binder is prepared by first hydrolyzing protein to produce protein hydrolysates. The protein can be animal protein, vegetable protein, or combinations thereof. More particularly, the vegetable protein can be soy isolate, soy flour, or a blend thereof.

The resultant protein hydrolysates can be mixed with a synthetic resin to produce a resin binder. The synthetic resin of the resin binder can be phenolic resin, isocyanate resin, or combinations thereof. The amount of resin binder included in the composite can be between about 2% and about 15% of the dry weight of the cellulosic material. Optionally, the amount of resin binder included in the composite can be between about 4% and about 8%, between about 4% and about 6%, or between about 4% and about 5% of the dry weight of the cellulosic material.

After application of the resin binder, the average moisture content of the cellulosic material can be between about 8% and about 35% by weight. If the synthetic resin is phenolic resin, the weight ratio of protein hydrolysates to phenolic resin making up the resin binder can be between about 10:90 and about 90:10. Optionally, this weight ratio can be between about 10:90 and about 75:25. Alternatively, this weight ratio can be between about 25:75 and about 75:25, or between about 25:75 and about 50:50.

If the synthetic resin is isocyanate resin, the weight ratio of protein hydrolysates to isocyanate resin making up the resin binder can be between about 10:90 and about 90:10. Optionally, this weight ratio can be between about 10:90 and about 75:25. Alternatively, this weight ratio can be between about 25:75 and about 75:25, or between about 25:75 and about 50:50.

Optionally, the synthetic resin may also be a combination of phenolic resin and isocyanate resin. The weight ratio of the isocyanate resin to the total of the protein hydrolysates and the phenolic resin making up the resin binder can be between about 25:75 and about 75:25.

Optionally, the synthetic resin can further comprise paraformaldehyde. The weight ratio of the paraformaldehyde to the total of the protein hydrolysates and the synthetic resin making up the resin binder can be between about 2:48 and about 15:35 based on 50% resin solids.

Optionally, the synthetic resin can further comprise a high methylol content phenol formaldehyde pre-polymer. The weight ratio of the high methylol content phenol formaldehyde pre-polymer to the total of the protein hydrolysates and the synthetic resin making up the resin binder can be between about 10:90 and about 90:10. Optionally, this weight ratio can be between about 25:75 and about 75:25.

Optionally, the cellulosic fiber composite can further comprise a silicone, silane, and combination thereof. The silicone, silane, or combination thereof can be applied as a coating to the composite, or it can be added to the resin binder to improve such properties as high temperature strength, water resistance, and decreased swelling caused by absorption of water.

The present invention is also directed to methods for preparing cellulosic fiber composites. These methods comprise: mixing a protein hydrolysate with a synthetic resin to produce a resin binder. The synthetic resin can be phenolic resin, isocyanate resin, or combinations thereof. The protein hydrolysates are prepared by hydrolyzing a source of protein with sodium carbonate. The synthetic resin can further comprise paraformaldehyde or high methylol content phenol formaldehyde pre-polymer. These methods further comprise: mixing the resin binder with cellulosic material, wherein the amount of resin binder added can be between about 2% and about 15% of the dry weight of the cellulosic material, to form a cellulosic material/resin binder blend; felting the cellulosic material/resin binder blend to form a low moisture-content mat; and pressing the low moisture-content mat at an elevated temperature and pressure, producing a cellulosic fiber composite. The moisture content of the composite can later be adjusted to a predetermined amount. A silicone, silane, or combination thereof may alternatively be applied to the cellulosic fiber composite as a coating, or added as part of the resin binder.

In addition, the present invention is also directed to finished cellulosic fiber composite articles, as well as methods for preparing finished cellulosic fiber composite articles. Alternatively, a laminate overlay can be applied to these finished articles.

Accordingly, it is an object of the present invention to provide cellulosic fiber composites comprising cellulosic material and a resin binder in which the resin binder contains a reduced amount of petrochemicals, and to provide methods for preparing such composites.

BRIEF DESCRIPTION OF THE DRAWINGS

The following detailed description of the present invention can be best understood when read in conjunction with the following drawings:

FIG. 1 is a plot diagram showing soy hydrolysate viscosity versus shear rate for each resin binder. The legend refers to the flour loading in mass percent.

FIG. 2 is a response curve diagram showing peak molecular weight of hydrolysate versus time and temperature of hydrolysis.

FIG. 3 is a response curve diagram showing total amine level of hydrolysate versus time and temperature of hydrolysis.

FIG. 4 is a diagram showing the relationship between internal bond strength (IB) and resin content, blend ratio, hot press time and temperature.

DETAILED DESCRIPTION

The cellulosic fiber composite of the present invention comprises cellulosic material and a resin binder that comprises protein hydrolysates and a synthetic resin, wherein the synthetic resin is phenolic resin, isocyanate resin, or combinations thereof. The composite contains an effective amount of resin binder so as to bind together the cellulosic material. By effective amount we mean the addition of resin binder in an amount so that it acts as an adhesive for the cellulosic material and not in an amount so that it is a major constituent of the composite. By effective amount we do not mean an amount sufficient to fully impregnate the cellulosic material, nor do we mean an amount sufficient to coat and encapsulate the cellulosic material.

This composite can be used in the production of agricultural and other cellulosic fiber composites such as agfiber board and oriented strand board that exhibit properties not obtained by the earlier products. By replacing a percentage of the synthetic resin with protein hydrolysates in a binder system for the manufacture of cellulosic fiber composites, the present invention overcomes many of the disadvantages of previous petroleum-derived resin binder systems. By using less synthetic resin (including formaldehyde-based resin), the cellulosic fiber composite of the present invention reduces formaldehyde emissions commonly associated with this type of composite. Also, because phenolic and isocyanate resins are difficult to handle in processing, the present invention further diminishes this drawback of previous synthetic resin binder systems.

The cellulosic material can be any suitable fiberous substance or substances that can be combined with a resin binder to produce a cellulosic fiber composite. For example, typical cellulosic fibers for use in the present invention include, but are not limited to, mixed hardwood or any other type of wood flake, as well as agricultural fiber such as wheat straw, rice straw, or combinations thereof. However, no specific source of cellulosic material is required.

The protein hydrolysate of the present invention can be any animal or vegetable protein source, or combination thereof. A typical source of vegetable protein is a legume-based protein such as soy protein. The soy protein can be soy isolate, soy flour, or a blend thereof. The weight ratio of this soy protein blend of soy isolate to soy flour can be about 50:50. By replacing a percentage of the synthetic resin with relatively inexpensive soy flour, the resultant synthetic resin binder system of the present invention provides an economically and environmentally favorable alternative to pure phenolic and isocyanate resin binder systems.

Soy protein is a complex biopolymer with a three dimensional structure with various fractions such as 2S, 7S and 11S protein components. Glycenin and conglycenin are the major components of protein isolate. Soy protein in its native state is only sparingly soluble. Acids and bases in the presence of heat can readily break down the structure and increase its water solubility. Further, such hydrolyzed fractions, mainly polypeptides, have exposed functional amino groups derived from lysine and N-terminal amino acids useful in cross-linking reactions with synthetic resins.

Hydrolysis of the protein source is employed to take advantage of reactive groups available in the protein to produce both strong and rapid cross-linking reactions with synthetic resin. Hydrolysis can be performed by alkaline hydrolysis. Although the inventors do not wish to be held to any particular theory, it is believed that through hydrolysis, the complex structure of the protein, more particularly, soy protein, is broken down to lower molecular weight fragments, thereby making more of its functional groups, such as amine and carboxyl, more readily available for reaction with synthetic resins and increasing its solubility in water. When soy flour is employed as the source of protein, soy hydrolysate viscosity will increase. Protein hydrolysates can be produced with the use of up to about 50% soy flour while still maintaining viscosity levels effective for typical binder formulation. However, while the testing focused on soy protein, it is contemplated that protein of any vegetable or animal source is applicable.

By varying the hydrolysis conditions in which the protein hydrolysates of the present invention are produced, some of the fundamental parameters of soy protein hydrolysate, such as molecular weight and its distribution, amine functionality, and rheology, can be affected. Alkaline hydrolysis of soy protein derived from soy isolate and soy flour show excellent correlation with time and temperature of hydrolysis to peak molecular weight, solution viscosity, and amine level of hydrolysates. Temperature of hydrolysis seems to have a more pronounced effect than time on these properties. Peak molecular weight and solution viscosity of hydrolysates decrease with increases in time and temperature of hydrolysis, due to break down of protein structure. Total amine level is found to increase with time and temperature of hydrolysis resulting from the generation of N-terminal amino acids, as a result of the opening up of the folded protein structure.

The protein hydrolysates of the present invention can be blended with a synthetic resin to produce a resin binder. The synthetic resin can be phenolic resin, isocyanate resin, or combinations thereof. The amount of the resin binder included in the composite can be between about 2% and about 15% of the dry weight of the cellulosic material. The addition of resin binder should be in an amount so that it acts as a binder or adhesive, and not in an amount sufficient to coat and encapsulate the cellulosic material. Optionally, the amount of resin binder included in the composite can be between about 4% and about 8% of the dry weight of the cellulosic material. More particularly, the amount of resin binder included in the composite can be between about 4% and about 6%, or between about 4% and about 5% of the dry weight of the cellulosic material.

The amount of resin binder included in the composite should not be sufficient to be considered a major constituent of the composite (greater than 40% of the composite). Nor should the amount of resin binder included in the composite be sufficient so that it fully impregnates the cellulosic material. After application of the resin binder, the average moisture content of the cellulosic material can be between about 8% and about 35% by weight. Increases in the viscosity of the resin binder are shown as reactive groups available in the protein source enhance cross-linking reactions between protein hydrolysates and phenolic resin.

The synthetic resin of the present invention can be phenolic resin. The phenolic resin can be, but is not limited to, phenol formaldehyde. A typical weight ratio of protein hydrolysates to phenolic resin making up the resin binder can be between about 10:90 and about 90:10. Weight ratios of protein hydrolysates to phenolic resin are more typically between about 10:90 and about 75:25, between about 25:75 and about 75:25, and between about 25:75 and about 50:50.

The synthetic resin of the present invention can optionally be an isocyanate resin. The isocyanate resin can be, but is not limited to, polymeric isocyanate. A typical weight ratio of protein hydrolysates to isocyanate resin making up this resin binder can be between about 10:90 and about 90:10. Weight ratios of protein hydrolysates to isocyanate resin are more typically between about 10:90 and about 75:25, between about 25:75 and about 75:25, and between about 25:75 and about 50:50.

The synthetic resin making up the resin binder of the present invention can also be a combination of phenolic resin and isocyanate resin. A typical weight ratio of the isocyanate resin to the total of the protein hydrolysates and the phenolic resin making up this resin binder can be between about 25:75 and about 75:25.

The amount of isocyanate resin making up the cellulosic fiber composite can be about 1% to about 6% based on the total weight of the cellulosic material. The amount of isocyanate resin making up the cellulosic fiber composite is more typically about 1% to about 3% based on the total weight of the cellulosic material. While improvements in strength properties and dimensional stability are seen with all the composites containing polymeric isocyanate, a cellulosic fiber composite made with a resin binder wherein the amount of isocyanate resin is about 1% to about 2% based on the total weight of the cellulosic material results in strength properties and dimensional stability equal to or better than traditional synthetic resin systems and approaches the performance of pure phenolic and isocyanate resin binder systems.

Alternatively, the synthetic resin of the present invention can further comprise paraformaldehyde. A typical weight ratio of the paraformaldehyde to the total of the protein hydrolysates and the synthetic resin making up this resin binder can be between about 2:48 and about 15:35 based on 50% resin solids, or typically about 5% of the cellulosic fiber composite based on 50% resin solids. The addition of paraformaldehyde can increase viscosity significantly in a relatively short period of time. Also, resin cure is accelerated by the addition of paraformaldehyde.

Optionally, the synthetic resin of the present invention can further comprise a high methylol content phenol formaldehyde pre-polymer. The molar ratio of formaldehyde to phenol to NaOH of the high methylol content phenol formaldehyde pre-polymer can be about 2:1:0.5. A typical weight ratio of the high methylol content phenol formaldehyde pre-polymer to the total of the protein hydrolysates and the synthetic resin making up this resin binder can be between about 10:90 and about 90:10. The weight ratio of the high methylol content phenol formaldehyde pre-polymer to the total of the protein hydrolysates and the synthetic resin making up this resin binder is more typically between about 25:75 and about 75:25.

Optionally, the cellulosic fiber composite can further comprise a silicone, silane, or combination thereof. The silicone, silane, or combination thereof can be applied as a coating to the composite. Alternatively, the silicone, silane, or combination thereof can be added as part of the resin binder. Silicone and/or silane compounds can be added to improve several properties of the cellulosic fiber composites. Such properties include high temperature strength, water resistance, and decreased swelling caused by absorption of water, better enabling the composite for exterior applications in which it would be exposed to the elements.

The amount of silicone, silane, or combination thereof comprising the cellulosic composite can be between about 0.1% and about 1.0% of the total amount of cellulosic material. While not wishing to be bound by any particular theory, it is contemplated that such silanes may produce moisture-resistant cross-linking reactive bonds to substrates such as the synthetic resins, protein hydrolysates, and cellulosic material of the present invention. Typical silanes include, but are not limited to, those functionalized with amino, epoxy, or urethane groups. Suitable silanes are available from Witco Corporation, Greenwich, Conn. These silanes can include primary and secondary aminofunctional silanes, di-aminofunctional silanes, epoxy functional silanes and silane cross-linkers.

A method for preparing a cellulosic fiber composite is also provided. The method comprises preparing protein hydrolysates from a source of protein by hydrolyzing the protein with sodium carbonate. The resultant protein hydrolysates are then mixed with a synthetic resin to produce a resin binder. In accordance with the different compositions of resin binders of the present invention, the protein can be any animal or vegetable protein, including, but not limited to, soy protein from soy isolate, soy flour, or a blend thereof. The synthetic resin can be a phenolic resin such as phenol formaldehyde, an isocyanate resin such as polymeric isocyante, paraformaldehyde, or high methylol content phenol formaldehyde pre-polymer, in different combinations thereof.

The method further comprises mixing the resin binder with a cellulosic material of the present invention. The amount of resin binder added to the cellulosic material can be between about 2% and about 15% of the dry weight of the cellulosic material. In accordance with the cellulosic fiber composites of the present invention, the amount of resin binder added can also be between about 4% and about 8%, between about 4% and about 6%, or between about 4% and about 5% of the dry weight of the cellulosic material. After adding the resin binder to the cellulosic material, these components are blended together in a blending device to form a cellulosic material/resin binder blend.

The average moisture content of the cellulosic material is between about 8% and about 35% by weight after application of the resin binder. Because of the relatively low moisture content of this cellulosic material, no additional drying step or stage is required prior to pressing. The method may proceed directly to the next step of felting the cellulosic material/resin binder blend to form a low moisture-content mat. By low moisture-content mat we mean a mat with a moisture content that is less than about 55% by weight. The cellulosic material/resin binder blend may then be transferred to a hot press. The hot press then presses the low moisture-content mat comprising the cellulosic material/resin binder blend at elevated temperature and pressure, producing a cellulosic fiber composite. The moisture content of the composite can then be adjusted to a predetermined amount. A silicone, silane, or combination thereof may alternatively be applied as a coating, or added as part of the resin binder, improving high temperature strength and water resistance of the cellulosic composite.

A method for preparing finished cellulosic fiber composite articles is also provided. This method produces finished cellulosic fiber composite articles directly from raw cellulosic material. The method saves both time and labor as the method eliminates the need to cut and/or sand the composite to form the finished article. By eliminating cutting and/or sanding, no material is wasted.

The method comprises mixing the protein hydrolysate of the present invention with a synthetic resin to produce a resin binder. The synthetic resin can be a phenolic resin such as phenol formaldehyde, an isocyanate resin such as polymeric isocyanate, paraformaldehyde, or high methylol content phenol formaldehyde pre-polymer, in different combinations thereof. The method further comprises mixing the resin binder with a cellulosic material of the present invention, to form a cellulosic material/resin binder blend. The amount of resin binder added to the cellulosic material, as well as the average moisture content of the cellulosic material after application of the resin binder, can be in accordance with the cellulosic fiber composite of the present invention. Because of the relatively low moisture content of this cellulosic material, no additional drying step or stage is required prior to pressing.

The method may proceed directly to the next step of felting the cellulosic material/resin binder blend to form a low moisture-content mat. By low moisture-content mat we mean a mat with a moisture content that is less than about 55% by weight. The cellulosic material/resin binder blend may then be transferred to a molding press. A suitable molding press for manufacturing finished cellulosic fiber composite articles is available Sorbilite Compression Molding Systems, Virginia Beach, Va. By varying the shape of the mold, it is possible to form a variety of contoured articles such as molded trims, door panels, counter tops, and the like. The molding press then molds the low moisture-content mat at elevated temperature and pressure, providing the finished cellulosic fiber composite article.

The method may also produce finished cellulosic fiber composite articles with decorative laminate overlays by laminating the overlays thereon.

In order that the invention may be more readily understood, reference is made to the following examples, which are intended to illustrate the invention, but not limit the scope thereof.

EXAMPLE 1

Hydrolysis

Materials. Soy isolate (PRO-COTE 200 from Protein Technologies, Inc.) and soy flour (Soy Fluff from Cargill) were evaluated. Samples were made using 100% soy isolate, 100% soy flour, and 50:50 soy isolate:soy flour blend.

Hydrolysis Conditions. Only alkaline hydrolysis was studied, although we expect other types of hydrolysis to produce similar results. A typical hydrolysis experiment consisted of making up a sodium carbonate solution in water (about 5.46 grams in 104.8 grams of water) and adding 65 grams of protein (either soy isolate, soy flour, or a blend thereof) in a stainless steel tubular pressure reactor. To prepare the various hydrolysates, the reactor was heated in an oven with mixing of its contents. Soy protein samples were then hydrolyzed at various prescribed temperatures and times as shown in Table 1 below. A standard protein content of about 36% solids was used. Hydrolysates were characterized for both molecular weight and amine level. Typical values for these parameters are also shown in Table 1 below.

TABLE 1

Typical Properties of Hydrolysates from Soy Isolate and Flour

| Lab Book Number Resin I.D. | Protein Source | Time of Hydrolysis, Hours | Temperature of Hydrolysis, Deg C. | Peak Molecular Weight, Dalton | Amine Level, mg/mL |
|---|---|---|---|---|---|
| 48177-8-01 | 100% Pro-Cote 200 | 14 | 100 | 20500 | 60 |
| 48177-8-02 | 100% Soy Flour | 24 | 100 | 11600 | 42 |
| 48177-8-03 | 50:50 Isolate & Flour | 24 | 120 | 8120 | 106 |
| 48177-8-04 (HT-1) | 100% Isolate from Hopton Industries | — | — | 20,000 | 84 |

Molecular Weight of Hydrolysates. Superose 12 chromatography was done on a 650 E Protein Purification System (Waters) with a Superose 12 HR 10/30 column (Pharmacia, Piscataway, N.J.). The column was run at room temperature with a flow rate of 0.5 ml/min. in phosphate buffered saline, pH 7, that contained 0.1% azide. The buffer was filtered through a 0.22-micron filter and stored at 4° C. until use. Fresh buffer was warmed and degassed by sonication prior to each run.

Samples of hydrolyzed soy products were prepared for chromatography by the addition of 12:L of soy hydrolysate to 1188:L phosphate buffered saline. The samples were sonicated to get a more uniform solution and vortexed to dissolve the solids. After centrifugation at 15,000 gravity for 10 minutes at 4° C., the dissolved samples were filtered through a 0.22-micron filter prior to injection onto the Superose 12 column. Chromatographic data was collected using Turbochrom software (Perkin Elmer).

Various standard proteins, ranging in size from 6,500 to 2,000,000 Daltons were prepared in the same buffer and injected into the Superose column to generate a standard curve of size and elution times. Elution times obtained with various hydrolyzed protein samples were used to estimate the molecular weights of hydrolysates.

Total Amine Analysis. A 1:800 dilution of the hydrolyzed soy sample was prepared in 0.1 M sodium bicarbonate, pH 8.5, and centrifuged. The supernatant was assayed for amine content. A standard curve using N-acetyl lysine, 4-1000:g/ml, was prepared in the same buffer.

2,4,6-Trinitrobenzenesulfonic acid was used as a 5% weight/volume methanol solution and stored at −20° C. Before each assay, the hydrolyzed soy sample was dissolved in 0.1 M sodium carbonate, pH 8.5, at a concentration of 0.012% weight/volume. Using a 96 well microliter plate, a 100:1 sample or standard was added to each well, followed by the addition of 125:1 of 15% sodium dodecyl sulfate and 25:1 of 1.5 N HCl. The plate was read at 355 nm using a microtiter plate reader.

The protein amino groups that react with 2,4,6-Trinitrobenzenesulfonic acid and thus contribute to the total amine concentration are the lysine side chains and alpha amino groups of each N-terminal amino acid. There was poor agreement, however, between the concentration of total amines determined by 2,4,6-Trinitrobenzenesulfonic acid reaction and the number of amines predicted from lysine concentration and the estimated concentration of N-terminal amines. The total amine concentration estimated in this study must, therefore, be viewed as a relative number compared to unhydrolysed samples. Since lysine concentration does not increase during hydrolysis, any increase in the total amine concentration must be due to the formation of additional N-terminal groups by peptide hydrolysis.

Rheology Measurements. Viscosities of samples were measured on a Rheometric Scientific SR5 controlled stress rheometer using a steady stress sweep experiment. Experiments were performed using 25 mm parallel plates at room temperature. The samples are identified in the table below. The stress was varied to obtain viscosity data over several decades of shear rate.

| Sample Number | Flour % | Water % | $Na_2CO_3$ % |
|---|---|---|---|
| 48177-8-25 | 25 | 69 | 6 |
| 48177-8-29 | 30 | 64 | 6 |
| 48177-8-17 | 31 | 63 | 6 |
| 48177-4-18 | 36 | 58 | 5 |
| 48018-35-2 | 40 | 55 | 5 |
| 48018-35-1 | 50 | 46 | 4 |

A plot of viscosity versus shear rate for each formulation is shown as FIG. 1. The viscosity versus shear rate behavior of all samples was similar. All of the samples exhibited significant shear thinning (viscosity reduction with increasing shear rate). The viscosity increases as the flour level increases. The viscosity of 50% flour is too high for use in a typical formulation for oriented strand board production. The viscosity versus shear rate plot is linear when plotted on a log-log scale, which is indicative of power law behavior. The power law equation and parameters from the different samples are listed below. In this equation, $\eta$ is the viscosity (poise), $\gamma$ is the shear rate, and n is the power law exponent.

$$\eta = K\gamma^{n-1}$$

| Sample Number | Flour % | K | n − 1 |
|---|---|---|---|
| 48177-8-25 | 25 | 22.2 | −0.59 |
| 48177-8-29 | 30 | 144 | −0.72 |
| 48177-8-17 | 31 | 180 | −0.71 |
| 48177-4-18 | 36 | 619 | −0.70 |
| 48018-35-2 | 40 | 568 | −0.65 |
| 48018-35-1 | 50 | 6550 | −0.73 |

EXAMPLE 2

Hydrolysis

Results and Discussion. In this example, alkaline hydrolysis of soy protein from isolates and flour under varying time and temperature conditions were examined. Hydrolysates were characterized for water solubility, molecular weight and its distribution, amine functionality, and viscosity as described in Example 1 above. Various hydrolysate samples evaluated in the study along with hydrolysis conditions and some of their properties are shown in Table 2 below.

TABLE 2

Typical Properties of Hydrolysates from Soy Isolate and Flour

| Identification of Adhesive | Part A In Adhesive Formulation | Protein Source | Time of Hydrolysis, Hours | Temperature of Hydrolysis, Deg C. | Peak Molecular Weight, Dalton | Amine Level, mg/mL |
|---|---|---|---|---|---|---|
| Control | Control from Hemmingway | 100% ARPRO | — | — | 22034 | 79 |
| Adhesive 1 | Hydrolysate 1 | 100% ARPRO | 14 | 100 | 20500 | 60 |
| Adhesive 2 | Hydrolysate 2 (Low Temp. Flour) | 100% Soy Flour | 24 | 100 | 11600 | 42 |
| Adhesive 3 | Hydrolysate 3 | 50:50 Isolate and Flour | 24 | 120 | 8120 | 106 |
| Adhesive 4 | Hydrolysate 4 | 25:75 Isolate:Flour | 24 | 120 | 9626 and 6626 | 92 |
| Adhesive 5 | Hydrolysate 5 (High Temp. Flour) | 100% Flour | 14 | 150 | 9420 | 108 |

Molecular weight and viscosity of hydrolysates decreased with increases in time and temperature of hydrolysis reaction. Total amine level and water solubility of hydrolysate increased with time and temperature of reaction. Typical response curves are shown in FIGS. 2 and 3. Temperature had a more dominant effect than time on these parameters. Molecular weight, amine level and viscosity of hydrolyates have been successfully correlated with time, temperature, and protein level (isolate versus flour) using statistically significant regression models.

As seen in FIG. 2, molecular weight decreased rapidly as the hydrolysis temperature increased above 100° C. Further, molecular weight distribution broadened. Regression analysis of the data showed favorable results, in that an $R^2$ value of 0.98 was obtained between peak molecular weight and time and temperature of alkaline hydrolysis.

The solution viscosity of the hydrolysate decreased with an increase in time and temperature of hydrolysis due to breakdown of the protein structure resulting in lower molecular weight fractions. The $R^2$ value for the correlation of solution viscosity with time and temperature of hydrolysis was 0.94.

FIG. 3 shows a typical response curve for total amine level as a function of time and temperature of hydrolysis. Amine level increased with time and temperature of hydrolysis as the protein structure is unfolded, exposing buried amine groups, and also due to formation of N-terminal amino acids resulting from the breakdown of polypeptide chains. Amine functionality has been successfully correlated to hydrolysis conditions with an $R^2$ value of 0.96.

EXAMPLE 3

Mixing Phenolic Resins with Protein Hydrolysates. Hydrolysates derived from 100% soy flour and 100% soy isolate at 36% solids content were mixed with phenol formaldehyde resin (RPPB 16185 from Georgia Pacific Resins, Inc.) and polymeric isocyanate resin (from Huntsman Chemicals) separately to estimate the useful pot life of the mixtures. If the viscosity exceeds 3000 cps, the resin binder cannot be used in oriented strand board production. A ratio of 1:1 for the protein hydrolysate and synthetic resin (either phenol formaldehyde or polymeric isocyanate) was used. Brookfield viscosity measurements showed that the mixtures made up of soy flour hydrolysate and either the phenol formaldehyde resin or the polymeric isocyanate resin have a useful pot life of about 60 minutes.

Hydrolysates derived from 100% soy flour and 100% soy isolate were evaluated as co-binders in combination with phenol formaldehyde and polymeric isocyanate resin. The resultant protein hydrolysates were mixed as a co-resin with a phenolic resin binder to form a highly cross-linked thermo set matrix. Improved bonding performance was observed in soy protein derived adhesives due to strong chemical reactions between the functional groups of the soy protein and phenolic resin and isocyanate binder.

EXAMPLE 4

Effects of Soy Hydrolysates on Bond Performance of Mixed Resin Adhesives

Experimental Procedure for Board Preparation and Testing

Property of Soy Hydrolysates and Soy/Resin Blend System. Four soy hydrolysates were evaluated. The blend ratios of soy hydrolysate to phenolic resin were either 25:75 (based on solids content) or 50:50. Properties (i.e., pH, viscosity, and solids content) of soy hydrolysates before and after blending with phenolic resin were determined.

Flake Preparation and Blending. All panels were made in the laboratory with mixed hardwood flakes obtained from a local flakeboard plant. To prepare each panel, flakes were weighed out and placed in a rotating drum-type blender. The resin blend, in amounts equal to 4.5 percent of the dry weight of flakes, was then weighed and applied by air-atomizing nozzles. Average moisture content of the flakes after spraying was 11 percent.

Mat Forming and Hot Pressing. After blending, the randomly oriented flakes were carefully felted into a 17 by 17 inch box to form the mat. The mat was transferred immediately to a 20 by 20 inch single-opening hot press with the platen temperature regulated at 370° F. Sufficient pressure (about 550 psi) was applied so that platens closed to 1.2-inch thickness stops in approximately 45 seconds. Press time was 4 minutes, 15 seconds after closure.

Sampling and Testing. All boards were conditioned in a chamber controlled at 50 percent relative humidity and 80° F. before testing; ending moisture content averaged 5.9 percent. After conditioning, each board was cut to yield four static-bending specimens and six specimens for tensile strength perpendicular to the face (internal bond).

The mechanical tests were performed in accordance with ASTM standards for evaluating the properties of wood-based fiber and particle panel materials (D-1037-86). The properties tested included internal bond strength (IB), modulus of rupture (MOR), modulus of elasticity (MOE), and thickness swell (TS).

Results and Discussions

Property of Soy Hydrolysates and Blended Soy/Resin System. Average pH, viscosity, and solids content of hydrolysates and soy/resin blend system are summarized in Table 3 below. The pH range for soy hydrolysates was from 8.67 to 9.98. The average pH of the phenolic resins studied was 12.06. Thus, it was expected that the pH for the soy/resin blend system would increase with an increase in phenolic resin in the blend system. Results suggest that the general rule of mixture can be applied to the mixed system. The solids content of the soy hydrolysates ranged from 36.7 to 38.1 percent and the solids content of the phenolic resin was 51.4 percent. The solids content of the soy/phenolic blends also increased as the phenolic resin content increased.

TABLE 3

Physical and Chemical Properties of Soy Hydrolysates Before and After Blending with Phenolic Resin.

| | Before Mix | | | After 25/75 Mix | | | After 50/50 Mix | | |
|---|---|---|---|---|---|---|---|---|---|
| Resin I.D. | pH | Visc., cps | Solid % | pH | Visc., cps | Solid % | pH | Visc., cps | Solid % |
| 48177-8-01 (100 ISO) | 8.67 | 3580 | 36.7 | 11.47 | 810 | 46.0 | 10.27 | 352.0 | 41.1 |
| 48177-8-02 (100 FLO) | 8.72 | 6130 | 38.1 | 11.45 | 780 | 46.4 | 10.24 | 2670 | 44.4 |

TABLE 3-continued

Physical and Chemical Properties of Soy Hydrolysates Before and After Blending with Phenolic Resin.

| | Before Mix | | | After 25/75 Mix | | | After 50/50 Mix | | |
|---|---|---|---|---|---|---|---|---|---|
| Resin I.D. | pH | Visc., cps | Solid % | pH | Visc., cps | Solid % | pH | Visc., cps | Solid % |
| 48177-8-03 (50/50) | 8.75 | 2490 | 36.9 | 11.52 | 545 | 458 | 10.81 | 1400 | 42.0 |
| 48177-8-04 (HT-1) | 9.98 | 1540 | 36.8 | 11.78 | 795 | 46.0 | 11.40 | 1870 | 41.9 |

The general rule of mixture could also be applied to the viscosity of the mixed soy/resin systems. However, with the 50:50 soy isolate to soy flour blend, two of the hydrolysates (100 ISO and HT-1) yielded a viscosity equal to or higher than that of the unmixed soy hydrolysates. This indicates significant interactions between soy hydrolysates and phenolic resin, resulting in the increase of viscosity of the mixed resin system.

Strength Property. Table 4 summarizes average MOE, MOR, and IB of flakeboards made from the resin adhesive systems. The 25:75 mixed system yielded slightly higher MOR than that of the 50:50 blended system. However, the 50:50 blended system resulted in slightly higher MOE as compared to that of the 25:75 blended resin system. On average, the phenolic resin bonded panels consistently yielded higher MOR and MOE than that of the mixed resin systems.

TABLE 4

Strength Properties of Flakeboards.

| | 25/75 Mix | | | 50/50 Mix | | |
|---|---|---|---|---|---|---|
| Resin I.D. | IB | MOR | MOE | IB | MOR | MOE |
| 48177-8-01 (100 ISO) | 100.7 | 3775 | 545750 | 42.6 | 3217 | 569250 |
| 48177-8-02 (100 FLO) | 92.0 | 3696 | 542600 | 61.4 | 3168 | 561950 |
| 48177-8-03 (50/50) | 91.4 | 4022 | 584150 | 48.5 | 3358 | 60000 |
| 48177-8-04 (HT-1) | 108.2 | 3585 | 552550 | 66.1 | 4134 | 623200 |
| CONTROL 100% Phenol Formaldehyde | 112.0 | 4311 | 633350 | | | |

Although the average IB of the phenolic resin bonded panel was slightly higher than that of 25:75 blended panels, the difference was rather insignificant (112 psi as compared to that of 98.1 psi). As the blend ratio increased to 50:50, the IB decreased substantially.

Resin viscosity could have a profound affect on glue bond formation. The optimum resin viscosity for the manufacture of oriented strand board is controlled between 250 and 750 cps. The viscosity of the 25 soy:75 phenol formaldehyde blends was at the upper range of optimum viscosity and that of 50 soy:50 phenol formaldehyde blends was significantly greater than the upper viscosity range. The high viscosity of the resin blend would adversely affect resin distributions, and in turn decrease bond strength.

The solids content of soy hydrolysates (i.e., 36.7 to 38.1%) was substantially lower than that of phenol formaldehyde resin (i.e., 51%). The low solids content would add shipping costs and also have negative effects on the performance of soy hydrolysate because of the extra water that has to be handled in the processing of oriented strand board. For instance, water that enters the cellulosic fiber furnish as part of the liquid resin also makes up a portion of the final mat moisture content entering the hot press. Hence, at a 4.5 percent addition of the soy/phenol formaldehyde mix resin solids, a maximum of 2.6 percent (for 50 soy:50 phenol formaldehyde mix, based on resin solids content of 42%) is added to the furnish. Since the average moisture content of the flakes used was 7.5 to 8.5 percent, moisture from resin could raise the final moisture content to 10 or 11 percent. At this level, the mat moisture content approaches the allowable limit that the press could tolerate, particularly when using a short hot press cycle.

EXAMPLE 5

Glue Bond Strength of Modified Soy Hydrolysates. The effect of increased solids content of hydrolysate (See FIG. 1) was evaluated. Four soy hydrolysates (48177-8 series) were modified, based mainly on the results of Example 1 and prepared for evaluation. Since the 25 soy:75 phenol formaldehyde mix yielded satisfactory IB strength and 50 soy:50 phenol formaldehyde produced inferior IB strength, a ratio of 35 soy to 65 phenol formaldehyde was chosen as the blend ratio in this example. The methods used in Example 1 were followed generally.

Table 5 summarizes the properties of soy hydrolysates and soy/phenol formaldehyde mixed resin systems.

TABLE 5

Properties of Soy Hydrolysates and Mixed Soy/Phenol Formaldehyde Systems.

| | Soy Hydrolysate | | | Soy/PF Systems | | |
|---|---|---|---|---|---|---|
| Sample I.D. | pH | Visc., cps | Solids % | pH | Visc., cps | % Solids |
| 48018-35-02 | 8.84 | 10,400 | 42.2 | 11.08 | 1,690 | 44.8 |
| 48177-08-06 | 8.88 | 1,400 | 37.0 | 10.72 | 1,450 | 43.3 |
| 48177-08-17 | 9.13 | 2,530 | 33.1 | 11.00 | 620 | 40.3 |
| 48177-08-25 | 9.34 | 325 | 24.9 | 10.92 | 200 | 35.6 |

The viscosity decreased substantially in the mix of soy hydrolysate 480180-35-02 (i.e., from 10,400 cps to 1,690 cps). The viscosity of the resin blend was satisfactory, but the high degree of viscosity build up in this short time may have affected the resin distribution. The viscosity of the 48177-08-06 mix was slightly higher (1,450 cps) than that of the un-mixed hydrolysates (1,400 cps), suggesting significant interactions between hydrolysates and phenol formaldehyde resin in the mix. It was noted later that the interaction between the hydrolysates and the phenol formaldehyde resin was high enough to cause difficulty in atomization of the resin mix system, and no panel was fabricated. The viscosity of the 48177-08-17 blend was also decreased significantly from 2,530 cps to 620 cps. As a result, this 48177-08-17 blend had the optimum resin viscosity among the four resins tested. The very low viscosity of the 48177-08-25 hydrolysates (i.e., 325 cps) yielded very low viscosity of the resin blend system (200 cps), which was below optimum range. Low viscosity together with very low solids content were found to cause high resin penetration and slower resin cure of this system.

The average IB for three resin systems are summarized as follows:

|  | IB | |
| --- | --- | --- |
| Resin I.D. | Psi | Standard Dev. |
| 48018-35-02 | 56.3 | 6.9 |
| 48177-08-06 | Bad resin spray | |
| 48177-08-17 | 57.8 | 6.6 |
| 48177-08-25 | 55.2 | 6.9 |
| Control Phenol Formaldehyde Resin | 91 | 10.3 |

The differences in IB among the soy resins were not significant, with exception of the 48177-08-06 resin. The results seem to suggest that the process modification made on the soy hydrolyzation yielded no additional improvements in glue bond performance. Furthermore, the average IB's of mixed resins were at least 39 percent lower than that of the control phenol formaldehyde resin, indicating that optimum IB could not be obtained by 35 percent weight substitutions of phenol formaldehyde by soy hydrolysates. Based on results from Examples 1, 2 and 5 it appears that the maximum level of substitution of phenol formaldehyde resin by soy hydrolysate is between 25% and 30%.

EXAMPLE 6

Effects of Process Variables on Performance of Soy (48177-8-02)/Phenol Formaldehyde Resin Blend. The effects of the process variables were evaluated using Soy (48177-8-02). The process variables evaluated were:

Soy/phenol formaldehyde ratios:0/100, 25/75, 35/65, and 45/55
Resin content:3.5, 4.5, and 5.5 percent
Hot press temperature:340°, 370°, and 400° F.
Hot press time:3.5, 4.5, and 5.5 minutes An orthogonal experimental design method was used in the study. Table 5 (6) summarizes IB strength of the resin systems.

The results show that hot press time is the most significant process variable to affect IB strength, followed in order by hot press temperature, soy/phenol formaldehyde ratio, and resin content. The significant effect of hot press time and temperature indicate the importance of resin cure rate. Therefore, in the hydrolysis process, molecular weight and amine level of soy hydrolysate were carefully controlled to balance optimum workable viscosity and favorable cure rate of the resin blend. However, no cure improvement was seen from various soy/phenol formaldehyde resin systems studied in this example. This observation seems to relate to the fact that no hardener/catalyst was used in this study to accelerate cure. It appears that the formaldehyde content of the resin system is an important factor affecting cure rate. As the ratio of soy/phenol formaldehyde resin increases in the blend, the ratio of formaldehyde/phenol decreases. Decreases in the formaldehyde to phenolic ratio could eventually develop into a condition of formaldehyde deficiency, adversely affecting resin cure rate and leading to weak bond with insufficient cross-linking.

TABLE 6

Summary Results of Internal Bond Strengths.

| No. | Soy/PF Ratio | Resin Content % | Hot-pressing | | Panel Density PcF | Performance | |
| --- | --- | --- | --- | --- | --- | --- | --- |
| | | | Temp., ° F. | Time, min | | Aver. IB psi | Std. Dev. IB psi |
| 0 | 0/100 | 4.5 | 370 | 4.5 | 48.0 | 63.3 | 16.3 |
| 1 | 25/75 | 3.5 | 340 | 3.5 | 45.9 | 14.0 | 14.1 |
| 2 | 25/75 | 4.5 | 370 | 4.5 | 48.8 | 48.7 | 18.9 |
| 3 | 25/75 | 5.5 | 400 | 5.5 | 49.0 | 93.5 | 11.0 |
| 4 | 35/65 | 3.5 | 340 | 5.5 | 47.8 | 54.3 | 6.8 |
| 5 | 35/65 | 4.5 | 400 | 3.5 | 49.0 | 36.8 | 12.0 |
| 6 | 35/65 | 5.5 | 340 | 4.5 | 48.2 | 48.3 | 10.9 |
| 7 | 45/55 | 3.5 | 400 | 4.5 | 48.0 | 40.5 | 11.9 |
| 8 | 45/55 | 4.5 | 340 | 5.5 | 48.6 | 41.7 | 13.4 |
| 9 | 45/55 | 5.5 | 370 | 3.5 | 46.9 | 12.6 | 11.7 |
| AVER. IB | | | | | | | |
| K1 | 52.1 | 36.2 | 34.6 | 21.1 | | | |
| K2 | 46.4 | 42.4 | 38.5 | 45.8 | | | |
| K3 | 31.6 | 51.4 | 56.9 | 63.2 | | | |
| Range | 20.5 | 15.2 | 22.3 | 42.0 | | | |
| *** | 3rd | 4th | 2nd | 1st | | | |

FIG. 4 presents the relationship between IB and resin content, blend ratio, hot press time and temperature. As expected, average IB increased as resin content, hot press time, and press temperature increased. Furthermore, IB decreased as the blend ratio of soy/phenol formaldehyde increased.

EXAMPLE 7

Addition of Paraformaldehyde. Previous experiments suggested that the formaldehyde content in the resin system effects IB strength. In this example, the formaldehyde content in the mixed resin systems was adjusted by the addition of paraformaldehyde. Panels were made with two resin systems: (1) 25 soy:75 phenol formaldehyde resin system without paraformaldehyde addition, and (2) 25 soy:75 phenol formaldehyde resin system with addition of 5 percent paraformaldehyde (based on resin solids) prior to the resin application. Average strength properties were as follows:

| Resin | IB (psi) | MOR (psi) | MOE (psi) |
|---|---|---|---|
| Without para | 98.8 | 4382 | 565100 |
| With 5% para | 56.2 | 3466 | 521800 |

The addition of paraformaldehyde did not achieve the improvement in strength properties that was expected. The addition of paraformaldehyde significantly increased the viscosity in a relatively short time period, indicating that paraformaldehyde addition accelerates resin cure. However, the rapid viscosity advancement suggests that the 5% paraformaldehyde addition may be more than is needed in the system. No further optimization of paraformaldehyde was made in this study. There was some difficulty in mixing paraformaldehyde powder evenly and smoothly into the resin system, suggesting that the regular 50% formaldehyde solution could have been a better choice for the application.

EXAMPLE 8

Addition of Phenol Formaldehyde Pre-Polymer with High Methylol Content. High methylol content phenol formaldehyde pre-polymer was formulated with a molar ratio of formaldehyde:phenol:NaOH at 2:1:0.5 and reacted at very low temperature for 36 hours. Three mixed resin systems were fabricated as follows: (1) Resin I (25 soy:75 pre-polymer mix), (2) Resin II (25 soy:37.5 pre-polymer:37.5 phenol formaldehyde resin mix), and Resin III (25 Soy: 18.75 pre-polymer:56.25 phenol formaldehyde resin mix). Average IBs are summarized below:

| Resin I.D. | IB (psi) |
|---|---|
| Resin I | Blow (Delaminated) |
| Resin II | 76.0 |
| Resin III | 119.0 |

Resin III seems to perform equal to or better than the soy/phenol formaldehyde resin system, indicating the potential for improvement of strength properties by the addition of highly reactive phenol formaldehyde pre-polymer into the resin system.

EXAMPLE 9

Strength Properties and Dimensional Stability of Soy/Phenol Formaldehyde Bonded Panel Products. The panel properties evaluated were based mainly on relatively small sized panels (17 by 17 inch). The strength properties and dimensional stability of larger sized panels (24 by 24 inch) were evaluated in this study. The soy:phenol formaldehyde ratio was 30:70. The variables considered in the experiment were:

Hot press temperature: 370° F. and 345° F.
Hot press time: 3.5 and 4.5 minutes
Resin content 3.5 and 4.5 percent

TABLE 7

Strength Properties and Dimensional Stability of Flakeboards Bonded with 30 Soy/70 Phenol Formaldehyde Resin System

| 370° F. Press Temp. 3.5% RC | 370° F. Press Temp. 4.5% PC | 340° F. Press Temp. 3.5% RC | 340° F. Press Temp. 4.5% PC | Control 370° F. | Control 340° F. | IB | MOR | MOE | LE | TS | WA |
|---|---|---|---|---|---|---|---|---|---|---|---|
| 3.5 min press | | | | | | 36.2 | 2209 | 618900 | 0.564 | 77.6 | 118.1 |
| 4.5 min press | | | | | | 49.0 | 2345 | 579200 | 0.768 | 66.9 | 112.3 |
| | 3.5 min press | | | | | 69.4 | 1973 | 587500 | 0.767 | 72.8 | 128.7 |
| | 4.5 min press | | | | | 81.3 | 2715 | 737400 | 0.448 | 67.5 | 122.6 |
| | | 3.5 min press | | | | 11.3 | 2171 | 526400 | 0.682 | 76.1 | 129.7 |
| | | 4.5 min press | | | | 19.7 | 1950 | 624900 | 0.758 | 61.6 | 125.8 |
| | | | 3.5 min press | | | 26.9 | 2655 | 766800 | 0.822 | 65.8 | 109.2 |
| | | | 4.5 min press | | | 43.9 | 2664 | 670700 | 0.803 | 72.0 | 109.3 |
| | | | | 3.5% RC 3.5 min | | 40.2 | 1631 | 448700 | 0.816 | 55.0 | 124.4 |
| | | | | 4.5% RC 4.5 min | | 85.9 | 2714 | 693200 | 0.752 | 54.3 | 115.9 |
| | | | | | 3.5% RC 3.5 min | 30.3 | 3314 | 727300 | 0.755 | 61.8 | 120.4 |
| | | | | | 4.5% RC 4.5 min | 65.5 | 4085 | 762100 | 0.623 | 50.2 | 108.6 |

LE = Linear Expansion
WA = Water Absorption

In general, the results are in good agreement with the results from previous experiments. Some major observations are noted here: The phenol formaldehyde resin (used as control), had an IB value of 85.9 psi, which is slightly lower than the average IB obtained in some of the previous experiments. The low IB is due mainly to the slightly shorter hot press time used in this example (4.5 min.) versus the hot press time used in previous experiments (5.0 min.). In the soy/phenol formaldehyde resin system, for the same reason, the highest IB value is 81.3 psi, which is also 10 to 15 percent lower than the previous IB value of 95 to 100 psi. In addition to shorter press time, the higher soy substitution of the soy/phenol formaldehyde system employed in this study (30 soy:70 phenol formaldehyde ratio instead of 25 soy:75 phenol formaldehyde) is a factor contributing to the lower IB. As hot press time and temperature are decreased, strength properties decreased substantially. The overall thickness swell (ranging from 50.2 to 77.6 percent) was more than double the desirable thickness swell of 25 percent for most oriented strand board panels. It is worth noting that even the phenol formaldehyde control had an unacceptable thickness swell of 50.2% to 61.8%. Compared to the phenol formaldehyde control, the experimental 30 soy:70 phenol formaldehyde binder system is about 15% higher in thickness swell. It is not clear why the phenol formaldehyde control system had such high thickness swell.

EXAMPLE 10

Effects of Isocyanate Addition on Glue Bond Strength. Polymeric isocyanate (PMDI) is known to perform well as a binder in the manufacture of oriented strand board and agfiber board. In this experiment, the effects of isocyanate addition to soy/phenol formaldehyde resin systems related to strength properties and dimensional stability were evaluated. All panels were made with a hot press temperature of 370° F. and a hot press time of 4.5 minutes. The isocyanate addition expressed in term of percent resin content ratios was:

2% PMDI:1% soy resin (30 soy:70 phenol formaldehyde blend)

1% PMDI:2% soy resin (30 soy:70 phenol formaldehyde blend)

1% PMDI:3% soy resin (30 soy:70 phenol formaldehyde blend)

Strength properties and dimensional stability of the panel products are summarized as follows:

| Resin I.D. | IB (psi) | MOR (psi) | MOE (psi) | LE, % | TS, % | WA, % |
| --- | --- | --- | --- | --- | --- | --- |
| 2% PMDI/1% Soy | 111.0 | 5566 | 754,000 | 0.438 | 18.7 | 93.3 |
| 1% PMDI/2% Soy | 91.3 | 4353 | 677,000 | 0.454 | 23.5 | 94.0 |
| 1% PMDI/3% Soy | 93.3 | 5310 | 810,000 | 0.561 | 25.3 | 100.8 |
| 3% PMDI | 115 | 5600 | 750000 | 0.441 | 19 | 94 |

The addition of polymeric isocyanate improved all properties of strength and dimensional stability. The following points are worth noting: (1) thickness swell was in the desirable 25% range, (2) at equal rate of total resin applications (i.e., 3%), IB increased substantially (i.e., 91.3 psi to 111.0 psi) as the polymeric isocyanate content increased (i.e., from 1% to 2%), and (3) at equal polymeric isocyanate content (i.e., 1%), IB increased only slightly (from 91.3 psi to 93.3 psi) as the soy resin content increased from 2% to 3%. For comparative purposes, typical literature values obtained for oriented strand board made with 3% polymeric isocyanate are shown in the above table.

The most interesting result in the study is the performance of the resin system composed of 1% polymeric isocyanate/ 2% soy resin blend. The strength properties and dimensional stability of the panels made with this resin system are equal to or better than the phenolic resin system and approach the performance of polymeric isocyanate system. Furthermore, these preliminary results show that this resin system has great potential as an alternative new resin system for wood composites because of its attractive performance/cost profile.

In today's oriented strand board industry, application of polymeric isocyanate resin is used at 2.5 to 3.5 percent resin content compared to 3.5 to 4.5 percent used in phenol formaldehyde resin system. Assuming the costs of isocyanate, phenol formaldehyde resin solid, and soy resin system respectively at 78, 40 and 30 cents per pound respectively, it is readily seen that significant cost savings are possible with the use of less expensive soy flour in a reduced polymeric isocyanate binder formulation.

Having described the invention in detail and by reference to embodiments thereof, it will be apparent that modifications and variations are possible without departing from the scope of the invention defined in the appended claims. More specifically, although some aspects of the present invention are identified herein, it is contemplated that the present invention is not necessarily limited to these preferred aspects of the invention.

What is claimed is:

1. A cellulosic fiber composite comprising:
   a cellulosic material; and
   a resin binder comprising vegetable protein hydrolysates and a synthetic resin, wherein
      the synthetic resin is phenolic resin, isocyanate resin, or combinations thereof, and
      the resin binder is present in an amount of less than 40% by weight of the composite.

2. The composite as claimed in claim 1 further comprising an average moisture content between about 8% and about 35% by weight.

3. The composite as claimed in claim 1 wherein the vegetable protein is soy protein.

4. The composite as claimed in claim 3 wherein the soy protein is soy isolate.

5. The composite as claimed in claim 3 wherein the soy protein is soy flour.

6. The composite as claimed in claim 3 wherein the soy protein is a blend of soy isolate and soy flour.

7. The composite as claimed in claim 6 wherein the weight ratio of the blend of soy isolate to soy flour is about 50:50.

8. The composite as claimed in claim 1 wherein the synthetic resin is phenolic resin.

9. The composite as claimed in claim 8 wherein the phenolic resin is phenol formaldehyde.

10. The composite as claimed in claim 8 wherein the resin binder has a weight ratio of protein hydrolysates to phenolic resin between about 10:90 and about 90:10.

11. The composite as claimed in claim 8 wherein the resin binder has a weight ratio of protein hydrolysates to phenolic resin between about 10:90 and about 75:25.

12. The composite as claimed in claim 8 wherein the resin binder has a weight ratio of protein hydrolysates to phenolic resin between about 25:75 and about 75:25.

13. The composite as claimed in claim 8 wherein the resin binder has a weight ratio of protein hydrolysate to phenolic resin between about 25:75 and about 50:50.

14. The composite as claimed in claim 1 wherein the synthetic resin further comprises paraformaldehyde.

15. The composite as claimed in claim 14 wherein the weight ratio of the paraformaldehyde to the total of the protein hydrolysates and the synthetic resin is between about 2:48 and about 15:35 based on 50% resin solids.

16. The composite as claimed in claim 1 wherein the synthetic resin Thither comprises high methylol content phenol formaldehyde pre-polymer.

17. The composite as claimed in claim 16 wherein the molar ratio of formaldehyde to phenol to NaOH of the high methylol content phenol formaldehyde pre-polymer is about 2:1:0.5.

18. The composite as claimed in claim 16 wherein the weight ratio of the high methylol content phenol formaldehyde pre-polymer to the total of the protein hydrolysates and the synthetic resin is between about 10:90 and about 90:10.

19. The composite as claimed in claim 16 wherein the weight ratio of the high methylol content phenol formaldehyde pre-polymer to the total of the protein hydrolysates and the synthetic resin is between about 25:75 and about 75:25.

20. The composite as claimed in claim 1 wherein the composite further comprises a silicone, silane, or combination thereof.

21. The composite as claimed in clam 20 wherein the silicone, silane, or combination thereof is applied as a coating to the composite.

22. The composite as claimed in claim 20 wherein the silicone, silane, or combination thereof is added to the resin binder.

23. The composite as claimed in claim 20 wherein the amount of silicone, silane, or combination thereof is between about 0.1% and about 1.0% based on the total amount of the cellulosic material.

24. A finished cellulosic fiber composite article prepared by the method comprising:
   a. mixing a protein hydrolysate with a synthetic resin, wherein the synthetic resin is phenolic resin, isocyanate resin, or combinations thereof, to produce a resin binder;
   b. mixing an amount of resin binder with a cellulosic material to form a cellulosic material/resin binder blend, wherein the amount of resin binder is less than 40% by weight of the cellulosic material/resin binder blend;
   c. felting the cellulosic material/resin binder blend to form a low moisture-content mat; and
   d. molding the low moisture-content mat at an elevated temperature and pressure, producing the finished cellulosic fiber composite article.

25. The article as claimed in claim 24 that further comprises a laminate overlay.

26. The composite as claimed in claim 1 wherein the synthetic resin is isocyanate resin.

27. The composite as claimed in claim 26 wherein the isocyanate resin is polymeric isocyanate.

28. The composite as claimed in claim 26 wherein the resin binder has a weight ratio of protein hydrolysates to isocyanate resin between about 10:90 and about 90:10.

29. The composite as claimed in claim 26 wherein the resin binder has a weight ratio of protein hydrolysates to isocyanate resin between about 10:90 and about 75:25.

30. The composite as claimed in claim 26 wherein the resin binder has a weight ratio of protein hydrolysates to isocyanate resin between about 25:75 and about 75:25.

31. The composite as claimed in claim 26 where in the resin binder has a weight ration of protein hydrolysates to isocyanate resin between about 25:75 and about 50:50.

32. The composite as claimed in claim 1 wherein the synthetic resin is a combination of phenolic resin and isocyanate resin.

33. The composite as claimed in claim 32 wherein the weight ratio of the isocyanate resin to the total of the protein hydrolysates and the phenolic resin is between about 25:75 and about 75:25.

34. The composite as claimed in claim 26 wherein the amount of isocyanate resin making up the composite is about 1% to about 6% based on the total weight of the cellulosic material.

35. The composite as claimed in claim 26 wherein the amount of isocyanate resin making up the composite is about 1% to about 3% based on the total weight of the cellulosic material.

36. The composite as claimed in claim 26 wherein the amount of isocyanate resin making up the composite is about 1% to about 2% based on the total weight of the cellulosic material.

* * * * *

UNITED STATES PATENT AND TRADEMARK OFFICE
CERTIFICATE OF CORRECTION

| | |
|---|---|
| PATENT NO. | : 7,282,117 B2 |
| APPLICATION NO. | : 10/698217 |
| DATED | : October 16, 2007 |
| INVENTOR(S) | : Bhima Rao Vijayendran |

Page 1 of 1

It is certified that error appears in the above-identified patent and that said Letters Patent is hereby corrected as shown below:

Col. 2, line 28, "hinder," should read -- binder, --

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,282,117 B2  Page 1 of 1
APPLICATION NO. : 10/698217
DATED : October 16, 2007
INVENTOR(S) : Vijayendran et al.

It is certified that error appears in the above-identified patent and that said Letters Patent is hereby corrected as shown below:

Col. 21 line 25, claim 21, clam should read -- claim --.

Signed and Sealed this

Sixth Day of January, 2009

JON W. DUDAS
*Director of the United States Patent and Trademark Office*